US010635746B2

(12) United States Patent
Kong et al.

(10) Patent No.: US 10,635,746 B2
(45) Date of Patent: Apr. 28, 2020

(54) WEB-BASED EMBEDDABLE COLLABORATIVE WORKSPACE

(71) Applicant: Microsoft Technology Licensing, LLC., Redmond, WA (US)

(72) Inventors: Fanguang Kong, Sammamish, WA (US); Yanir Shahak, Sammamish, WA (US); Wei Wang, Bellevue, WA (US); Jorge Eugenio Aguirre Gonzalez, Redmond, WA (US); Jay Ongg, Renton, WA (US); Darren Glenn Austin, Seattle, WA (US); Gareth Alun Jones, Snoqualmie, WA (US); Rahee Ghosh, Cambridge, MA (US); Ankit Srivastava, Vancouver (CA); Guy Daher, Vancouver (CA); Kiky Wibowo Tangerine, Vancouver (CA); Mun Ying Leong, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 15/263,323

(22) Filed: Sep. 12, 2016

(65) Prior Publication Data
US 2017/0315974 A1 Nov. 2, 2017

Related U.S. Application Data

(60) Provisional application No. 62/329,785, filed on Apr. 29, 2016.

(51) Int. Cl.
*G06F 3/00* (2006.01)
*G06F 17/24* (2006.01)
(Continued)

(52) U.S. Cl.
CPC ............ *G06F 17/24* (2013.01); *G06F 16/972* (2019.01); *G06F 17/2247* (2013.01); *G06F 17/242* (2013.01); *H04L 51/22* (2013.01)

(58) Field of Classification Search
CPC .............. G06F 17/2247; G06F 17/242; G06F 17/30893; G06F 17/24; G06F 16/972; H04L 51/22
See application file for complete search history.

(56) References Cited

U.S. PATENT DOCUMENTS 6,717,593 B1 4/2004 Jennings
8,938,669 B1 1/2015 Cohen
(Continued)

FOREIGN PATENT DOCUMENTS

CA 2795913 A1 10/2011
CN 102035835 A 4/2011
EP 1363232 A2 11/2003

OTHER PUBLICATIONS

Madhusudanan, Anoop, "Silver Draw—A Silverlight Based Collaboration White Board with Drawing and Chat", Published on: Nov. 2, 2009 Available at: http://www.codeproject.com/Articles/43427/Silver-Draw-A-Silverlight-Based-Collaboration-Whit.
(Continued)

*Primary Examiner* — Kyle R Stork

(57) ABSTRACT

Freeform input is not native to several application or document types, but is desired by users as an input mode, especially for collaboration. Systems and methods are therefore provided to enable the insertion of an electronic collaboration workspace that accepts and stores freeform input for use as an object embeddable in various documents. An external host application provides the functionalities needed for freeform input, and the inputs may be committed to the document or stored as a separate document which may be referenced and accessed by multiple users for purposes of collaboration.

19 Claims, 10 Drawing Sheets

(51) Int. Cl.
*G06F 16/958* (2019.01)
*G06F 17/22* (2006.01)
*H04L 12/58* (2006.01)

(56) References Cited

U.S. PATENT DOCUMENTS

| | | | |
|---|---|---|---|
| 2005/0060655 A1 | 3/2005 | Gray et al. | |
| 2006/0031755 A1* | 2/2006 | Kashi | G06F 17/242 715/201 |
| 2007/0050710 A1 | 3/2007 | Redekop | |
| 2007/0288644 A1 | 12/2007 | Rojas et al. | |
| 2011/0016409 A1 | 1/2011 | Grosz et al. | |
| 2014/0143806 A1* | 5/2014 | Steinberg | H04N 21/23424 725/34 |
| 2014/0281875 A1* | 9/2014 | Branton | G06F 17/241 715/230 |
| 2014/0283096 A1* | 9/2014 | Neerumalla | G06F 21/10 726/26 |
| 2015/0121183 A1 | 4/2015 | Mahoney et al. | |
| 2015/0199270 A1* | 7/2015 | Day-Richter | G06F 12/0253 707/816 |
| 2017/0060829 A1* | 3/2017 | Bhatt | G06F 17/241 |

OTHER PUBLICATIONS

Betters, Elyse, "What is Slack and how does it work?", Published on: Jan. 16, 2016 Available at: http://www.pocket-lint.com/news/136472-what-is-slack-and-how-does-it-work.

Lowensohn, Josh, "Live whiteboard collaboration with Scriblink", Published on: Sep. 10, 2007 Available at: http://www.cnet.com/news/live-whiteboard-collaboration-with-scriblink/.

"Moxtra—Team Collaboration and Communication", Retrieved on: Mar. 12, 2016 Available at: https://itunes.apple.com/za/app/moxtra-team-collaboration/id590571587?mt=8.

Williams, Alex, "New Google Docs Features: Added Co-Editing Capabilities, Similar to Google Wave", Published on: Apr. 12, 2010 Available at: http://readwrite.com/2010/04/12/google-docs-now-includes-co-ed.

"Twiddla API Reference", Published on: Jun. 19, 2010 Available at: http://www.twiddla.com/API/Reference.aspx.

"Web-based Secure Real-Time Communication and Collaboration", Retrieved on: Mar. 12, 2016 Available at: http://www.collabworx.com/docs/CWx_%ATOv2.pdf.

"Communicate with Coccinella", Published on: Oct. 25, 2008 Available at: http://thecoccinella.org/about.

Bajayo, Jeff, "Former Google Employee launches Instant Messenger Imo.im", Published on: Feb. 24, 2010 Available at: http://thenextweb.com/apps/2010/02/24/google-employees-imoim/#gref.

"Apache OpenMeetings—Features and overview", Published on: Jan. 30, 2013 Available at: http://openmeetings.apache.org/.

Houk, Ashlynn, "Making Student Learning Visible", Retrieved From <<http://blog.webassign.com/making-student-learning-visible>>, Mar. 31, 2016, 4 Pages.

"International Search Report and Written Opinion Issued in PCT Application No. PCT/US2017/029036", dated Aug. 1, 2017, 14 Pages.

* cited by examiner

WEB-BASED EMBEDDABLE COLLABORATIVE WORKSPACE

CROSS-REFERENCES TO RELATED APPLICATIONS

The present disclosure claims benefit to U.S. Provisional Application No. 62/329,785 filed on 29 Apr. 2016, titled "WEB-BASED EMBEDDABLE COLLABORATIVE WORKSPACE," which is incorporated herein by reference.

BACKGROUND

User interaction with websites, as opposed to passive viewing of hosted content, has been referred to as "Web 2.0," and includes social media websites, blogs, wikis, video sharing sites, websites with comment sections or forum features, etc. Users of Web 2.0 sites often use embedded Rich Text Boxes (RTB) with various formatting controls (e.g., graphical user interface (GUI) controls, hypertext markup language (HTML) or proprietary tags) to enter text and "richness" to the text (i.e., formatting information for the text and non-text objects) when interacting with the websites. To enter content beyond text within a single box (e.g., a second text box within a first text box, columns of text, images, videos, hyperlinks, other non-text objects), the user may be provided various dialogs to upload those content items, or the user may link to a non-text item (e.g., as a hyperlink or an anchored object) via tags within the text. RTBs, however, do not allow freeform interaction or collaboration, and are unwieldy, especially when adding objects other than text or trying to converse or collaborate via successive posts, such as in an online forum or message board. Alternatively, users may collaborate online within a single document when using a cloud-based software package or via a Software as a Service (SaaS) system. Cloud-based software, however, is computationally expensive to provide (data are transmitted to a provider server and interpreted twice) and is accessed at provider-specific websites or portals; it is not embeddable into a Web 2.0 UX on third-party webpages or into applications, which requires the user to shift focus between multiple applications, which further requires computing and memory resources to be expended for multiple applications.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling a web-based embeddable collaborative workspace. A canvas is provided for use as the web-based embeddable collaborative workspace to enable user interaction and collaboration beyond text entry and manipulation, such that a user is given freeform access to interact with the application, rather than or in addition to structured text-based interactions. Rich interactivity is enabled between the application and the user, enabling the user to post formattable text as well as non-text objects (e.g., pen input, images, videos, sound files) without the need of dialogs, special text-based tags, or a third-party server to host the interaction experience. By including the embeddable collaborative workspace, a user experience (UX) is improved for users, and the amount of data that need to be transmitted can be reduced by enabling the application to provide the improved UX without relying on separate applications.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
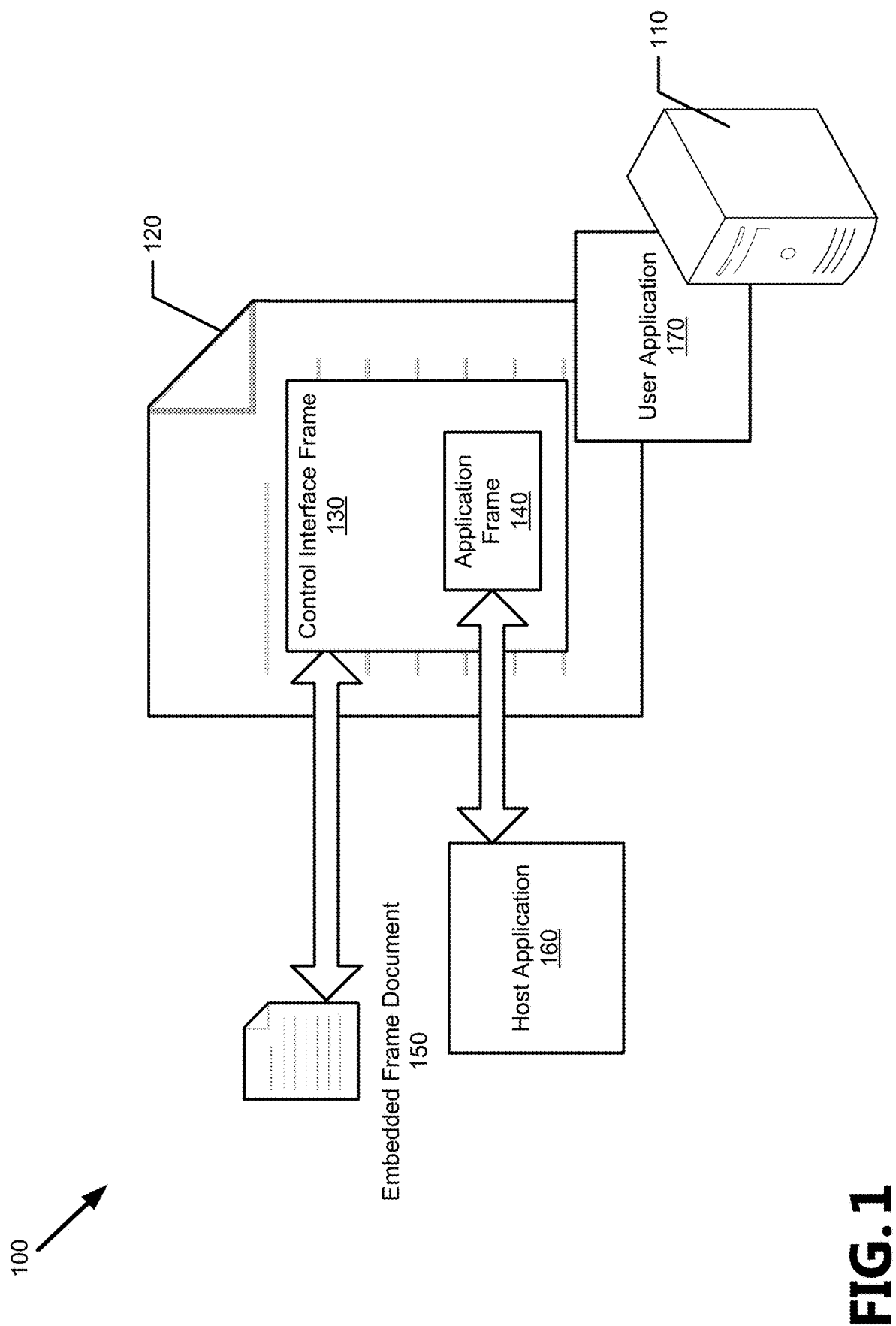
FIG. 1 illustrates an example environment in which an electronic collaborative workspace may be implemented.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

A Rich Text Box (RTB) is a common control feature used to add interactivity to a webpage, document, or application. For example, a webpage may include an RTB for users to leave comments on the webpage, or a spreadsheet application may embed an RTB to allow user input in addition to the columns, rows, and cells of the spreadsheet document. RTBs, however, use a structured input model; users type text and add non-text objects as though they were text (e.g., sinistrodextrally/dextrosinistrally/bidirectionally in rows or top to bottom in columns).

Users who desire freeform input may turn to alternative applications to augment their communications. For example, a first user may use a screen capture of freeform input to include as an image in an RTB, or a collaborative group may communicate via email, but keep an online whiteboard that allows freeform input that they link to or reference in their emails. To run multiple applications and/or save additional files to communicate in a freeform manner adds additional computational costs, and reduces the ease of communications between persons.

An Embeddable Collaborative Workspace that allows freeform input of text and non-text objects, which is not constrained to the flow of text, enables an improved user experience (UX) for how users may interact and communicate with each other by various applications. For example, an Embeddable Collaborative Workspace may be provided in place of or in addition to an RTB in the design of a webpage for an art gallery as a way to provide users with interactivity with the artists, so that users commenting on a webpage for a work of art may make comments directly on an image of the work of art in the webpage, may leave a free-form comment below (or to a side of) the image, and may make comments collaboratively with other users instead of or in addition to separate "posts." In another example, an application may increase its ease of use for freeform input by allowing users to include an Embeddable Collaborative Workspace within a document.

FIG. 1 illustrates an example environment 100 in which an Embeddable Collaborative Workspace may be implemented. As illustrated, a user machine 110 is running a user application 170 that accesses a Document Object Model (DOM) 120 with two embedded frames; a control interface frame 130 and an application frame 140. The control interface frame 130 specifies the locational and size properties for the Embeddable Collaborative Workspace in the document and is linked to an embedded frame document 150. The application frame 140 is embedded in the control interface frame 130 and is linked to a host application 160 to provide the freeform editing functionalities to the Embeddable Collaborative Workspace in the document.

The user machine 110 is illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 5, 6A, 6B, and 7. In various aspects, the user machine 110 is accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The DOM 120 is illustrative of the back-end code comprising a multitude of documents and applications, including, without limitation, word processing documents, spreadsheet files, presentation files, email files, note taking files, webpages, and custom executables. In various aspects, the DOM 120 is formatted according to an extensible markup language (XML) format, a hypertext markup language (HTML) format, PERL, C++, VisualBasic, JavaScript, or various other coding formats. As will be appreciated, the DOM 120 is interpreted by the application running on the user machine 110 to be displayed as the document; the DOM 120 defines what the user sees and in various aspects is hidden from the user's view.

When a host wishes to embed an Embeddable Collaborative Workspace, its application code will include a Software Developer Kit (SDK) for the Embeddable Collaborative Workspace, and the DOM 120 will reference the SDK (for example, in a header section of an HTML construction). In various aspects, the commands for input in the Embeddable Collaborative Workspace may be limited to a subset of available commands in the SDK, for example, the commands (and GUI elements) may be matched to a host application's commands to match its UX. For example, an Embeddable Collaborative Workspace inserted into a website accessed by a note taking application may use the command bar of the note taking application for GUI elements to edit the inputs in the Embeddable Collaborative Workspace, an Embeddable Collaborative Workspace inserted into a website accessed by web browser may use a custom set of GUI elements to edit inputs in the Embeddable Collaborative Workspace, an Embeddable Collaborative Workspace inserted into a website accessed by a word processing application may limit which of its GUI elements are accessible while the canvas has focus, etc.

Various Application Program Interfaces (APIs) are included in the SDK such that when the SDK is referenced in the DOM 120, the commands received from the user machine 110 and the application the user accesses the document by are translated for posting to the host application 160, and responses from the host application 160 are translated for incorporation into the DOM 120. Commands may be received from input devices such as mice, keyboards, remote controls, and the like, or from natural user input (NUI) methods including those relying on speech recognition, touch and stylus recognition, gesture recognition both on screen and adjacent to the screen, air gestures, head and eye tracking, voice and speech, vision, touch, hover, gestures, and machine intelligence.

The document is opened and accessed according to its DOM 120 by the user application 170, which is illustrative of any number of productivity applications in which users may author or coauthor content. In various aspects, the user application 170 does not natively support coauthoring with freeform input and uses the embedded frame document 150 and host application 160 to handle coauthoring with freeform inputs as an embedded field within the standard UX and DOM 120 of the user application 170. Although several examples are given herein in terms of the DOM 120 being for a website and the user application 170 being a web browser, other styles of documents and applications may also make use of the present disclosure to include an Embeddable Collaborative Workspace within their DOMs 120. For example, a user of a spreadsheet program (such as, for example, the Numbers® spreadsheet application from Apple, Inc. of Cupertino, Calif.) or a presentation program (such as, for example, the Pages® presentation application, also from Apple, Inc.) may incorporate an Embeddable Collaborative Workspace into a spreadsheet document or slide show document. Therefore, a discussion of a website will be understood to be illustrative and to include other document types. An Embeddable Collaborative Workspace enables the content editing and viewing interface to be decoupled from a productivity application to be embeddable in a web-based communication system, such as, for example, an instant messenger, an email, an MMS (Multimedia Message System) text, a forum, digital discussion board, team notebook, wiki, etc.

Within the DOM 120, a control interface 130 is embedded, which allows the display of the Embeddable Collaborative Workspace in the document when the user views the document. The control interface 130 specifies, in relation to the other elements of the DOM 120, where in the document the Embeddable Collaborative Workspace is to be shown, how large the Embeddable Collaborative Workspace will be, and other properties for the display of the Embeddable Collaborative Workspace to the user. In various aspects, the control interface 130 is embedded as an inline frame into the DOM 120 (e.g., as an "iframe" element) and references an embedded frame document 150. As part of referencing the embedded frame document 150 for the Embeddable Collaborative Workspace, the DOM 120 may reference a document stored locally to the user machine 110 or in a cloud server (e.g., a host for a webpage, a third-party software as a service (SaaS) provider's cloud productivity platforms, such as Google Docs™ (available from Alphabet, Inc. of Mountain View, Calif.), Office365® (available from Microsoft Corp., of Redmond, Wash.), or Slack (available from Slack Tech., Inc. of San Francisco, Calif.). In various aspects, the embedded frame document 150 may be a note taking document, such as a OneNote® document (available from Microsoft, Corp.), an Evernote® document (available from Evernote Corp., of Redwood City, Calif.), a Notes® document (available from Apple, Inc.) or another document type that allows freeform input.

In various aspects, the embedded frame document 150 may be an existing document (which may contain previously added content) or may be an as-of-yet uncreated document, in which case the embedded frame document 150 will be created and saved on its host when a user adds content to the Embeddable Collaborative Workspace (on a timed basis or when a user indicates a "submit" command). In alternate aspects, the embedded frame document 150 may exist only in active memory on the user machine 110 until a "submit" command is indicated by the user, at which time the embedded frame document 150 will be created or the content will be integrated into the DOM 120. For example, a user may access a website that includes an Embeddable Collaborative Workspace, to which the user adds content and maintains the content in active memory until hitting a "submit" button, at which time the content is transmitted to the website's host and the embedded frame document 150 is integrated into the DOM 120. In another example, a user may access an email message whose DOM 120 includes the Embeddable Collaborative Workspace linked to an existing embedded frame document 150 stored on a cloud server, which the user may add to or view existing content from.

The embedded frame document 150 may operate in read-only mode or in read-write mode depending on the access controls of the user. For example, a website using Embeddable Collaborative Workspaces to build a forum experience that allows freeform input may allow all of the users read-write access to existing messages that they posted, but read-only access to messages that other users posted. Contrarily, an administrator may be granted read-write access to messages posted by any user based on administrative access privileges to moderate the forum and a visitor (or a user who has not logged in) may be granted read-only access to all (or a subset) of the messages. In various aspects, the permissions and account settings of the user (e.g., user name, password, input preferences) are passed along with the user's input to manage the authentication of the user when the user attempts to access or update the embedded frame document 150 or add content thereto.

Unlike RTBs, an Embeddable Collaborative Workspace accepts freeform input and is not dependent on the direction of text input (e.g., left to right, right to left, top to bottom); a user may select a location within the canvas of an Embeddable Collaborative Workspace and provide input at that location regardless of the presence of other content also present at that location. For example, a user may input an image by dragging the image into a position in the Embeddable Collaborative Workspace and may then write on top of the image, highlight a section of the image with a shape tool, provide pen input, etc. The freeform input of an Embeddable Collaborative Workspace may also include text directional input, and include the functionalities of an RTB. For example, a user may click a location in the canvas and type text input and include (manually or via a GUI) the tags to add richness to the text, such as, for example, formatting cues, hyperlinks, tables, etc. An Embeddable Collaborative Workspace may include various controls in its canvas (i.e., the portion that accepts content), reference controls provided by a user application (e.g., in a ribbon or tool bar for the application), or reference controls provided in the document (e.g., ActiveX controls, or in-document controls).

The user application 170 used to handle inputs to the Embeddable Collaborative Workspace is the host application 160, and it is referenced by the control interface frame 130 from the DOM 120. The control interface frame 130 may point to an application hosted remotely or locally to where the embedded frame document 150 is stored, and the host application 160 may be any program capable of accepting and rendering freeform input. The control interface frame 130 passes several parameters to the host application 160, which allows the host application 160 to modify its display to conform with the desired use case of the Embeddable Collaborative Workspace. For example, various GUI elements may be removed from the display of the Embeddable Collaborative Workspace from those which the host application 160 would normally provide, additional controls may be added to a canvas of the Embeddable Collaborative Workspace, or the controls may be made to match the look-and-feel of the user application 170 used by the user machine 110 to access the document.

Figure 2A:
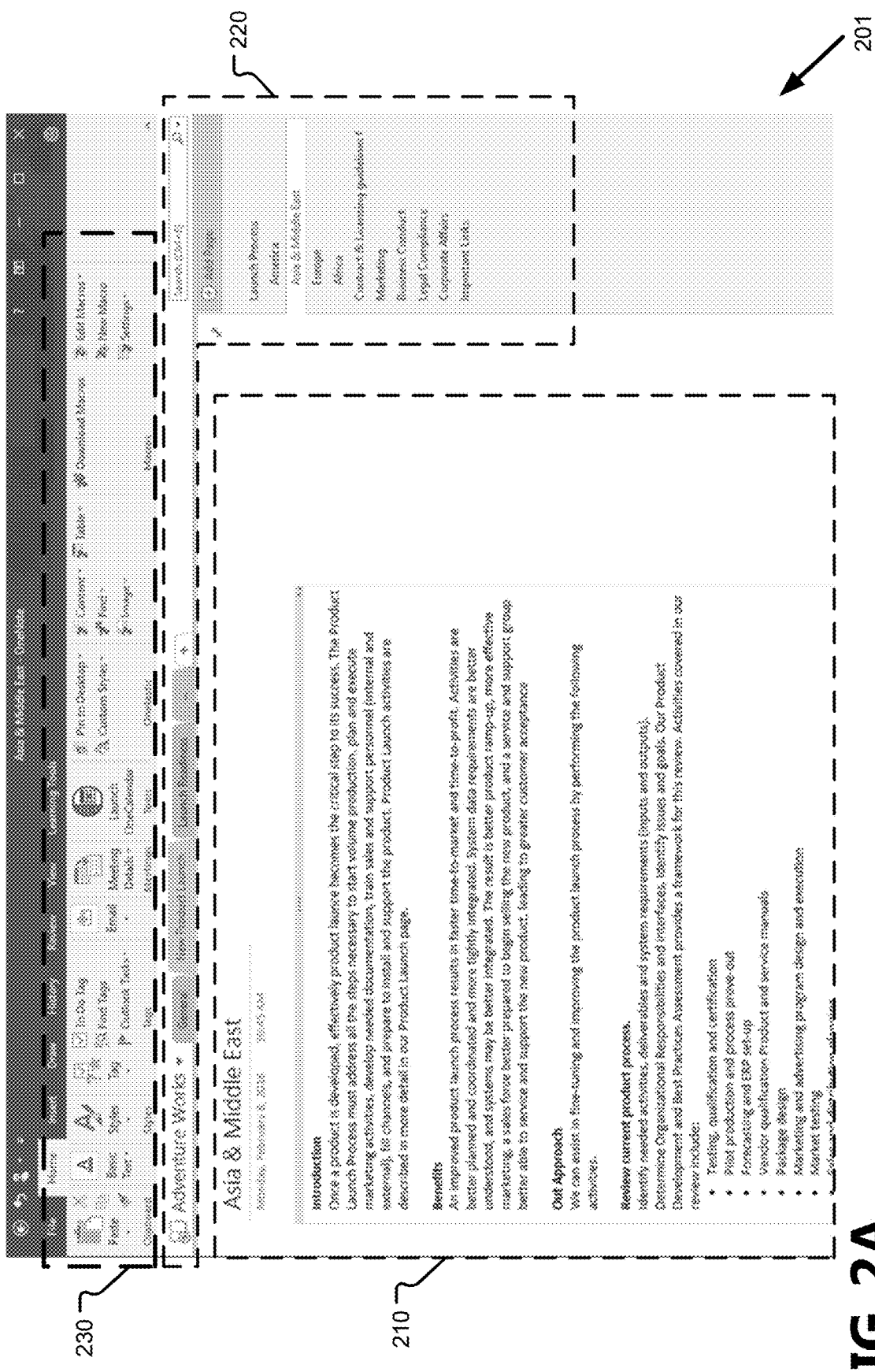
FIGS. 2A and 2B illustrate example user interfaces for accepting freeform input.

FIG. 2A illustrates a UI 201 for a program that natively supports freeform input, which may be referenced as the host application 160. Examples of programs that natively support freeform input include, but are not limited to: OneNote® (available from Microsoft, Corp.), Google Keep™ (available from Alphabet, Inc.), Evernote® (available from Evernote Corp.), and Notes® (available from Apple, Inc.). As illustrated, the freeform canvas 210 is where content is added and authored, which may include various content types that may be added in structured formats (e.g., text entry) or freeform formats (e.g., drag and drop, pen input). The organizational metadata 220 for the application is displayed according to the layout of the UI 201 particular to the application, as are the control interfaces 230. The control interfaces 230 may affect the freeform canvas, classes or selections of objects in the freeform canvas 210, and the document itself (e.g., user preferences, save commands, mail merge).

Figure 2B:
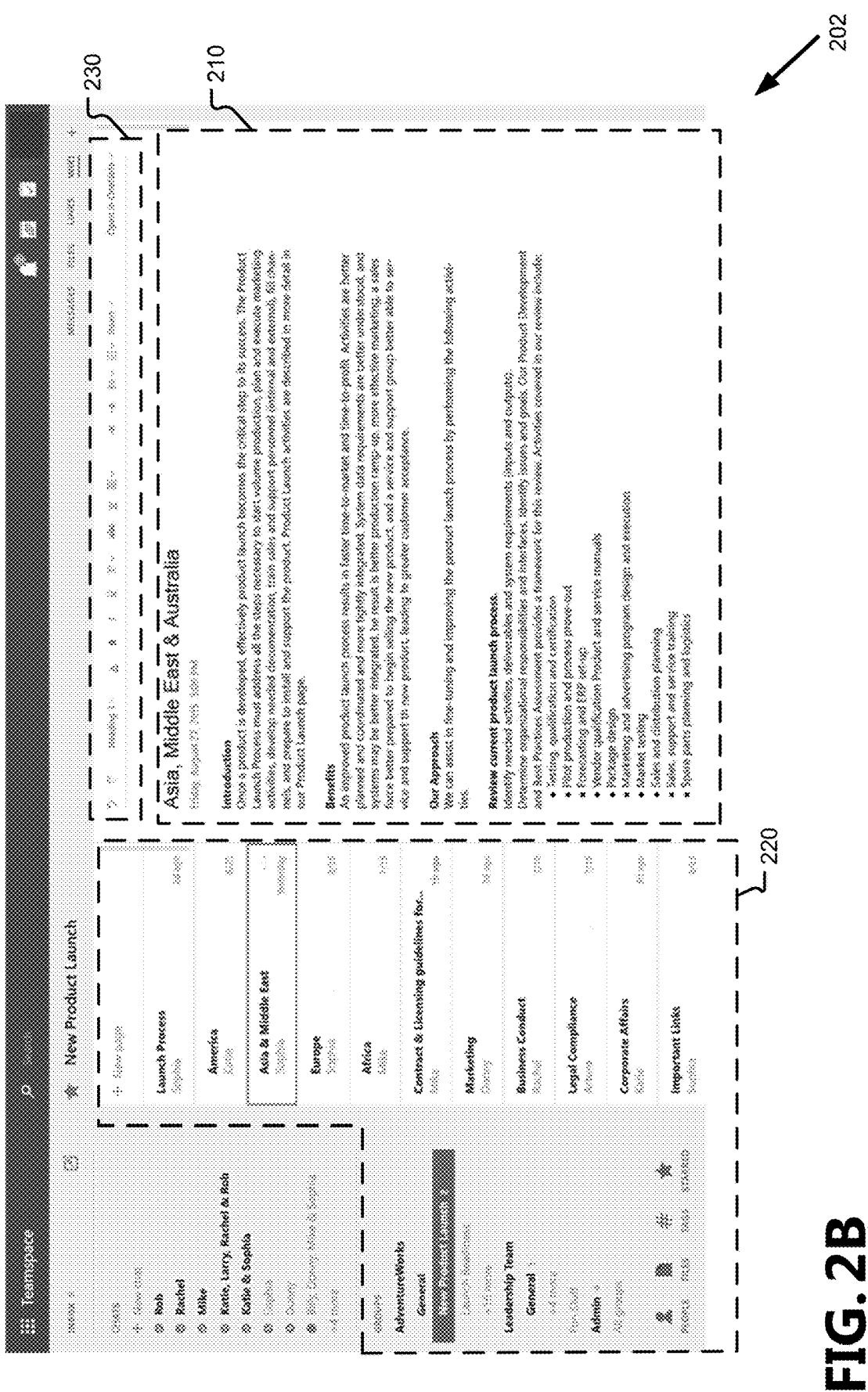

FIG. 2B illustrates a UI 202 for a user application 170 which may not natively support freeform input, but has integrated an Embeddable Collaborative Workspace to handle freeform input. As illustrated, the content in the freeform canvases 210 of FIGS. 2A and 2B are the same, but the UX and organizational metadata 220 of the user application 170 shown in FIG. 2B has been preserved from the native application and incorporates command interfaces 230 from the user application 170. The freeform canvas 210 may be defined in the UI 202 as described in reference to FIG. 1 to use a program that natively supports freeform input as a host application 160 and the content to be saved may use a file type of that program as the embedded frame document 150. The setup of the command interface 230 may use the interfaces native to the user application 170 (as is illustrated), interfaces from the host application 160, interfaces from both applications, or a subset thereof. As illustrated, a GUI element in the command interface 230 of the UI 202 enables a user to open the embedded frame document 150 in the host application 160 instead of or in addition to the instance open in the user application 170, in this case: the OneNote® note taking application (available from Microsoft, Corp.).

Figure 3A:
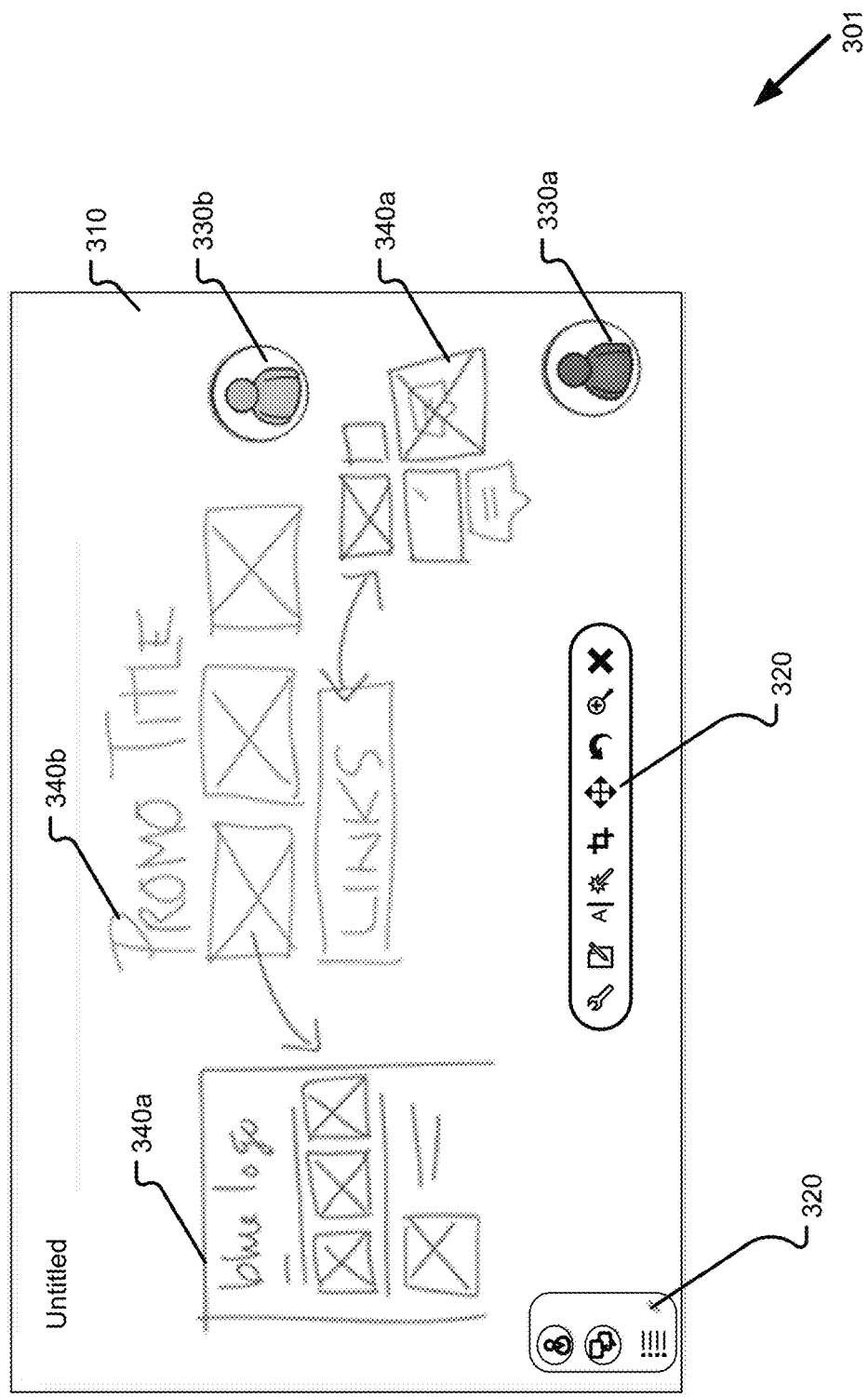
FIGS. 3A and 3B illustrate several example user interfaces in which an electronic collaborative workspace has been embedded.
Figure 3B:
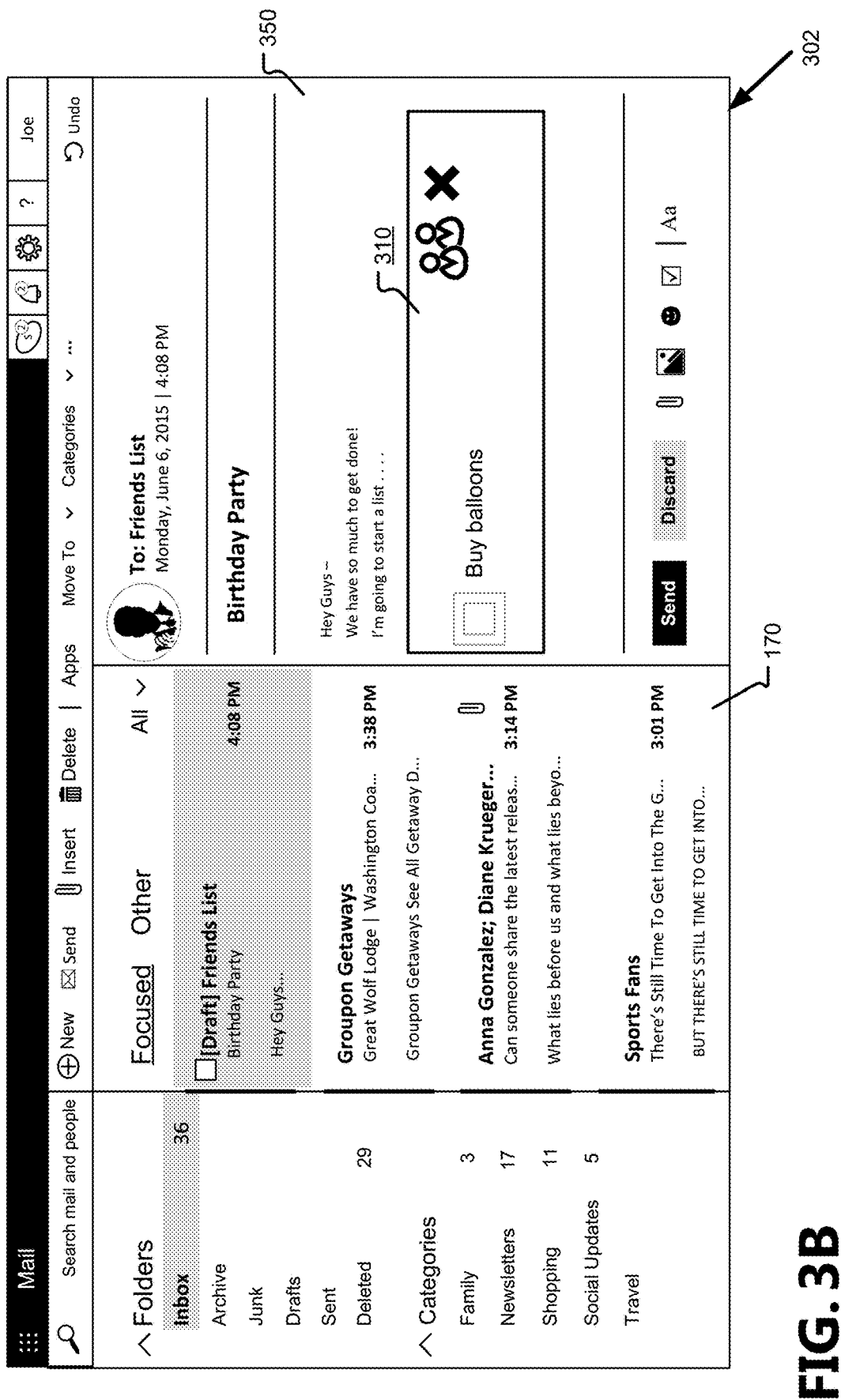

FIGS. 3A and 3B illustrate several example UI in which an Embeddable Collaborative Workspace has been embedded; FIG. 3A illustrates an example whiteboard UI 301 and FIG. 3B illustrates an example email client UI 302.

In FIG. 3A, a whiteboard UI 301 of a canvas 310 that accepts freeform inputs is illustrated, including an embedded command interface 320. Users who have read and write access are able to use the embedded command interface 320 to add inputs to the canvas 310. Inputs may include freeform inputs (e.g., drag and drop, pen input) as well as structured inputs, such as text. For example, a user may drag an RTB into the canvas 310 to a desired location (freeform input) and then type in that RTB (structured input). The controls and commands available in the embedded command interface 320 may be all or subset of the controls available from the host application 160, or all or a subset of the controls available from the user application 170 in which the canvas 310 has been embedded. The canvas 310 may be embedded in a portion of the user application 170 (e.g., the UI) or in an individual document.

When coauthoring in an Embeddable Collaborative Workspace, user indicators 330 are provided for each user to identify who is editing the canvas 310 and what those edits 340 are. For example, a first user may be associated with a first user indicator 330a and first edits 340a (made by the first user) by a first color (dark gray, green, etc.), and a second user may be associated with a second user indicator 330b and second edits 340b (made by the second user) by a second color (light gray, blue, etc.). For example, a user indicator 330 may show a color or pattern that may be applied to that user's edits 340 in the canvas 310 that will be unique to that user. Users may modify the color and/or pattern associated with their edits 340 to customize their coauthoring experience.

In various aspects, a user may actuate a user indicator 330 to highlight the associated edits 340, hide the associated edits 340, or to turn off the associated color or pattern to show the underlying formatting of the edits 340. For example, by actuating the user indication 330, the associated edits 340 may animate (e.g., a flash, pulse, be bolded) or the other edits may be reduced in prominence (e.g., be hidden, grayed out, diminish in size) to highlight the given user's edits 340. In another example, actuating the user indication 330 will hide or gray out the given user's edits 340. In yet another example, consider the situation where a first user's edits 340a are shown in green to differentiate them from the edits made by other users, but the first user's edits 340a are actually input as blue freeform pen input. By actuating the user indicator 330a in this situation, the green edits 340a associated with the first input will be removed so that users may see the actual color of the first user's inputs 340a. As will be appreciated, the canvas 310 may support additional controls to turn the edit highlighting on or off for one or more of the coauthors. Content associated with a no-longer active user may retain an association with that specific user, may be associated with no highlighting options, or may be associated with a system's highlighting options for all content edited by non-active users as a catchall.

In FIG. 3B a user application 170 of an email client 302 is illustrated in which a canvas 310 has been embedded in a message area 305 of an email document. As will be appreciated, although the canvas 310 has been added to an email document, it may remain a living document in the chain of emails (i.e., the series of replies back and forth among users regarding the message) via the storage solution of the embedded frame document 150, such that the contents of the canvas 310 will remain up-to-date as users edit the canvas 310. In various aspects, the canvas 310 may remain in a given position in the chain of emails (e.g., where a user inserted it) or may remain "on top" in the chain of emails so that each recipient will see the canvas 310 in the most recent email received or the email that is currently being composed. When editing the canvas 310 in the email client 302, the user may remain in the email client 302, or switch to a full-canvas editing mode via either a full screen interface for the canvas 310 provided within the context of the email client 302 or a full screen interface via the host application 160.

Figure 4:
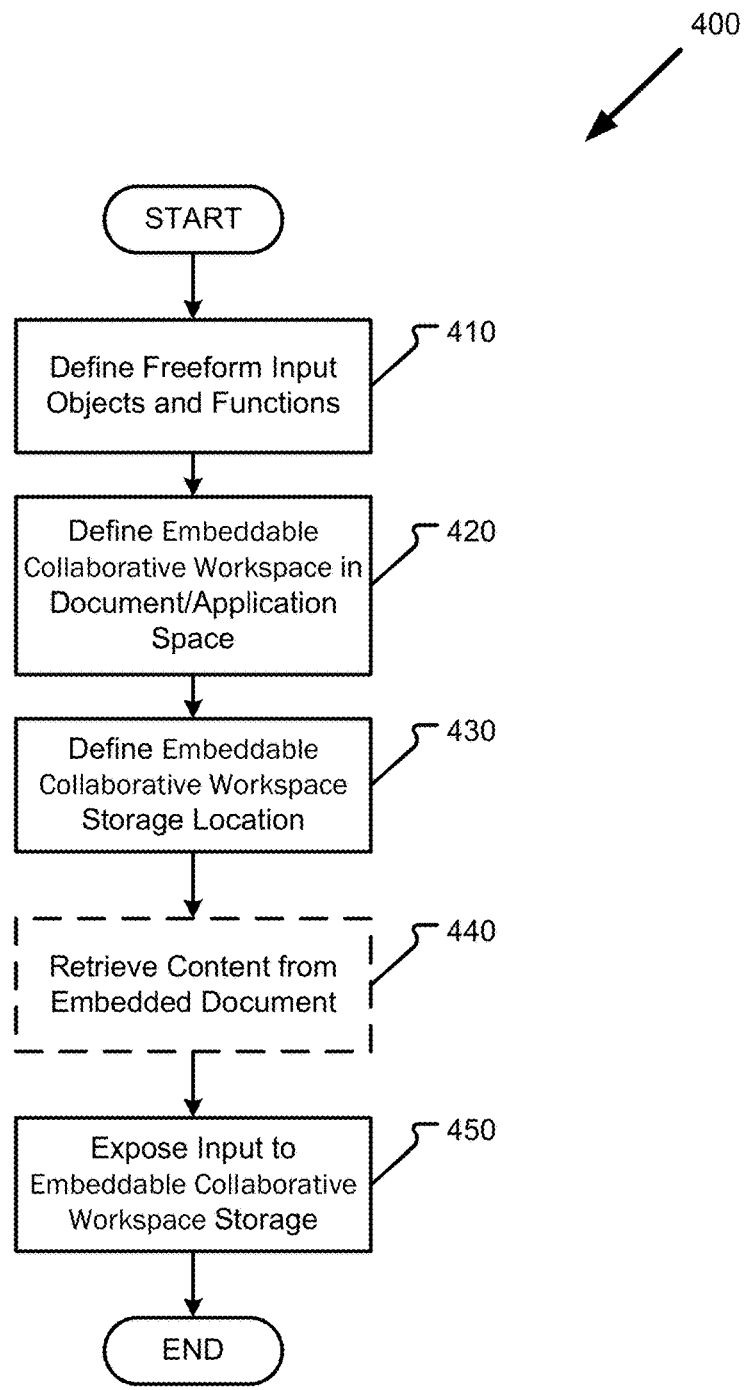
FIG. 4 is a flowchart showing general stages involved in an example method for enabling a freeform electronic collaborative workspace to be embedded as an object in various documents and applications.

FIG. 4 is a flowchart showing general stages involved in an example method 400 for enabling a freeform Embeddable Collaborative Workspace to be embedded as an object in various documents and applications. Method 400 begins at OPERATION 410, where freeform input objects are defined in a user facing application, such as a web browser, that may not natively support freeform input. These objects may be defined by embedding or referencing an SDK that creates the classes of objects and functions needed to manipulate such objects.

At OPERATION 420 the Embeddable Collaborative Workspace is defined in the space of the document or application's UI. As will be appreciated, the size, shape, and location of the Embeddable Collaborative Workspace in the UI is defined differently in different scenarios, and the Embeddable Collaborative Workspace may be defined relative to the other objects in the UI or absolutely in the UI so that the Embeddable Collaborative Workspace may grow/shrink or change location as the display changes size (on different display devices or in response to a window size changing) or remain the same size and in the same location regardless of display size, respectively. The commanding interfaces for the Embeddable Collaborative Workspace are also defined at OPERATION 420, such that the menu or ribbon of a local application (or a subset thereof), controls from a document (or a subset thereof), or controls within the Embeddable Collaborative Workspace itself may be specified. In various aspects, the menu or ribbon (or a subset thereof) for the host application 160 of the Embeddable Collaborative Workspace may be specified as command interfaces to be included in the canvas of the Embeddable Collaborative Workspace.

Similarly, at OPERATION 430, a storage location for the freeform input is defined. In various aspects, the Embeddable Collaborative Workspace may be collaboratively used by multiple users to leave inputs simultaneously or at different times, and will therefore need to be accessible across multiple sessions. A user, when defining a storage solution may indicate which other users may provide inputs (read-write access) or view (read-only access) the storage solution, or the access settings for other users may be set by an administrator for the host for the storage solution. For example, a group electronic whiteboard may be built as an Embeddable Collaborative Workspace that is shared in email documents for a working group of users. In other aspects, the Embeddable Collaborative Workspace may be used by a single user or combined with previous Embeddable Collaborative Workspaces from a host, that user, or other users. For example, an online forum may provide freeform input via Embeddable Collaborative Workspaces rather than RTBs to post into a forum thread that the user may edit later. In another example, several users may comment on an image via Embeddable Collaborative Workspaces, and each successive user's input may be merged with that image to show overlapping comments on the image supplied via the Embeddable Collaborative Workspaces. In various aspects, the storage location may include an existing document, an as-of-yet uncreated document, or may specify that the Embeddable Collaborative Workspace is to remain in active memory until a "submit" command is received, at which point a document may be created which the DOM 120 may reference or the content from the Embeddable Collaborative Workspace is integrated into the DOM 120.

In various aspects, the Embeddable Collaborative Workspace is defined as a first frame object in the DOM 120 of the document or application that references an embedded frame document 150 or other storage solution for maintaining the freeform input. The first frame object includes a second frame object as a sub-frame and each frame handles different aspects of how to incorporate an Embeddable Collaborative Workspace into the UI. The first frame handles sending and receiving commands to and from the commanding interfaces that affect the Embeddable Collaborative Workspace (e.g., an application menu or ribbon, in-document UI elements, and user elements in the Embeddable Collaborative Workspace), while the second frame acts as an intermediary between the user's application and a host application 160 used to provide the Embeddable Collaborative Workspace experience in the user's application, and validates and translates, via various APIs, the messages between the UI and the host application 160. The experience of the host application 160 is thus provided in the document or user application, and is tailored to the desired UX.

OPTIONAL OPERATION 440 is performed when the Embeddable Collaborative Workspace references an existing embedded frame document 150 as its storage solution. At OPTIONAL OPERATION 440, the content from the embedded frame document 150 is retrieved and displayed for the user. For example, when the Embeddable Collaborative Workspace is a group whiteboard, previous content entry made by the user or collaborators will have been saved to the embedded frame document 150, and will be retrieved so that collaboration via the group whiteboard may progress across multiple access sessions; work performed in the Embeddable Collaborative Workspace is saved to the embedded frame document 150 and is retrieved later to continue or to build upon the earlier work.

At OPERATION 450 inputs made by the user are exposed to the Embeddable Collaborative Workspace storage solution. For example, every n milliseconds, every n actions, every n bytes of content manipulated, or when a user manually selects a "submit" command, the Embeddable Collaborative Workspace is exposed to the storage solution. Exposing the Embeddable Collaborative Workspace may entail, in different aspects, exposing a change log or exposing a document state to the storage solution so that the storage solution will reflect the user's inputs to the Embeddable Collaborative Workspace. As will be appreciated, the host application 160 may perform various conflict resolution steps to ensure that edits in the Embeddable Collaborative Workspace made by different users do not override one another or cause aberrant behavior in the storage solution. The storage solution may be a cloud-based document that handles freeform input, a locally shared document that handles freeform input, or the DOM 120 itself if an Embeddable Collaborative Workspace is committed to the DOM 120 upon a "submit" command (e.g., a forum post).

Method 400 repeats through OPERATION 450 and OPTIONAL OPERATION 440 multiple times as user(s) interact with the Embeddable Collaborative Workspace and new content is continually added or retrieved from the storage solution. When a user ends an authoring session (e.g., closes an authoring program or leaves the focus of the Embeddable Collaborative Workspace), method 400 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
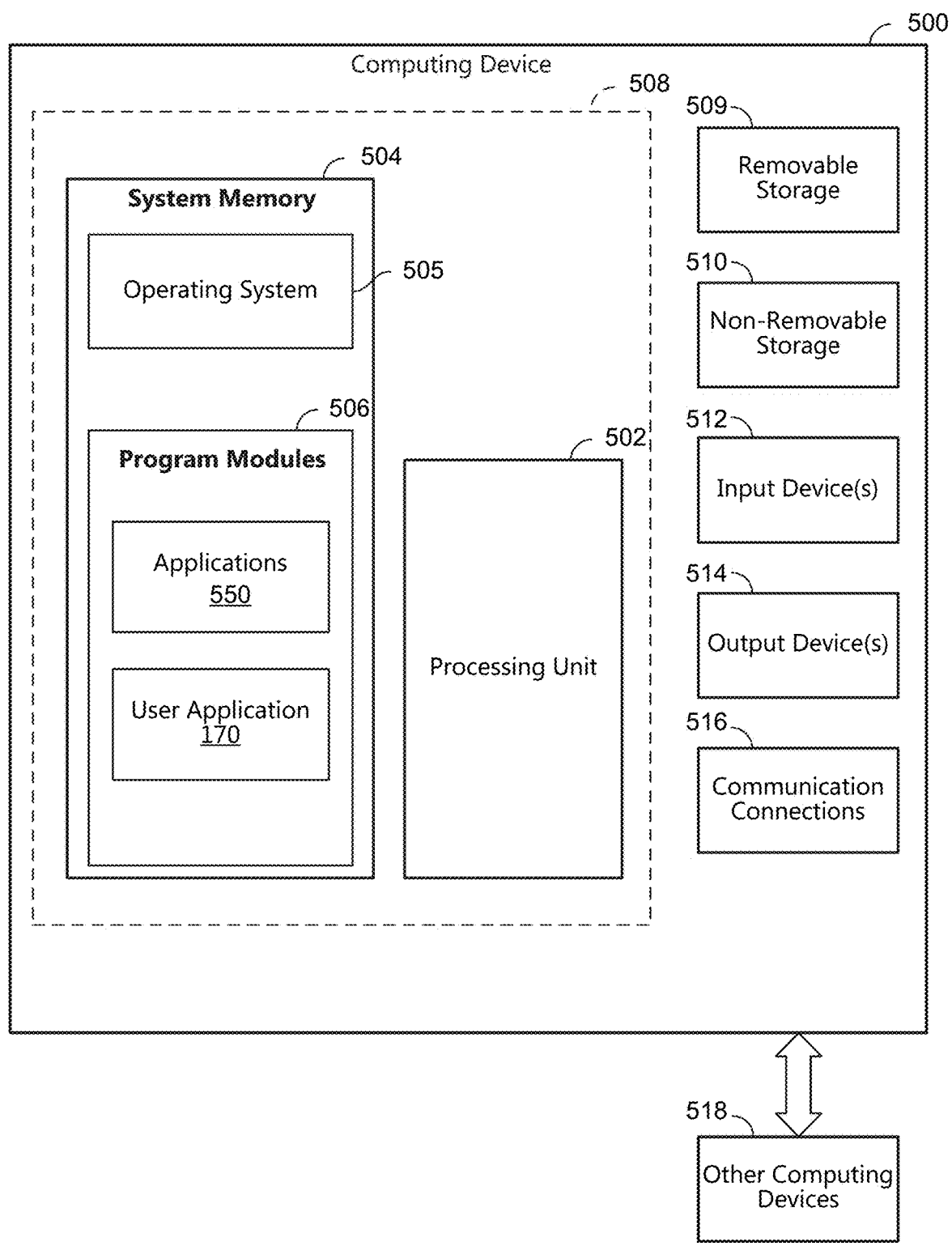
FIG. 5 is a block diagram illustrating physical components of a computing device with which examples may be practiced.
Figure 6A:
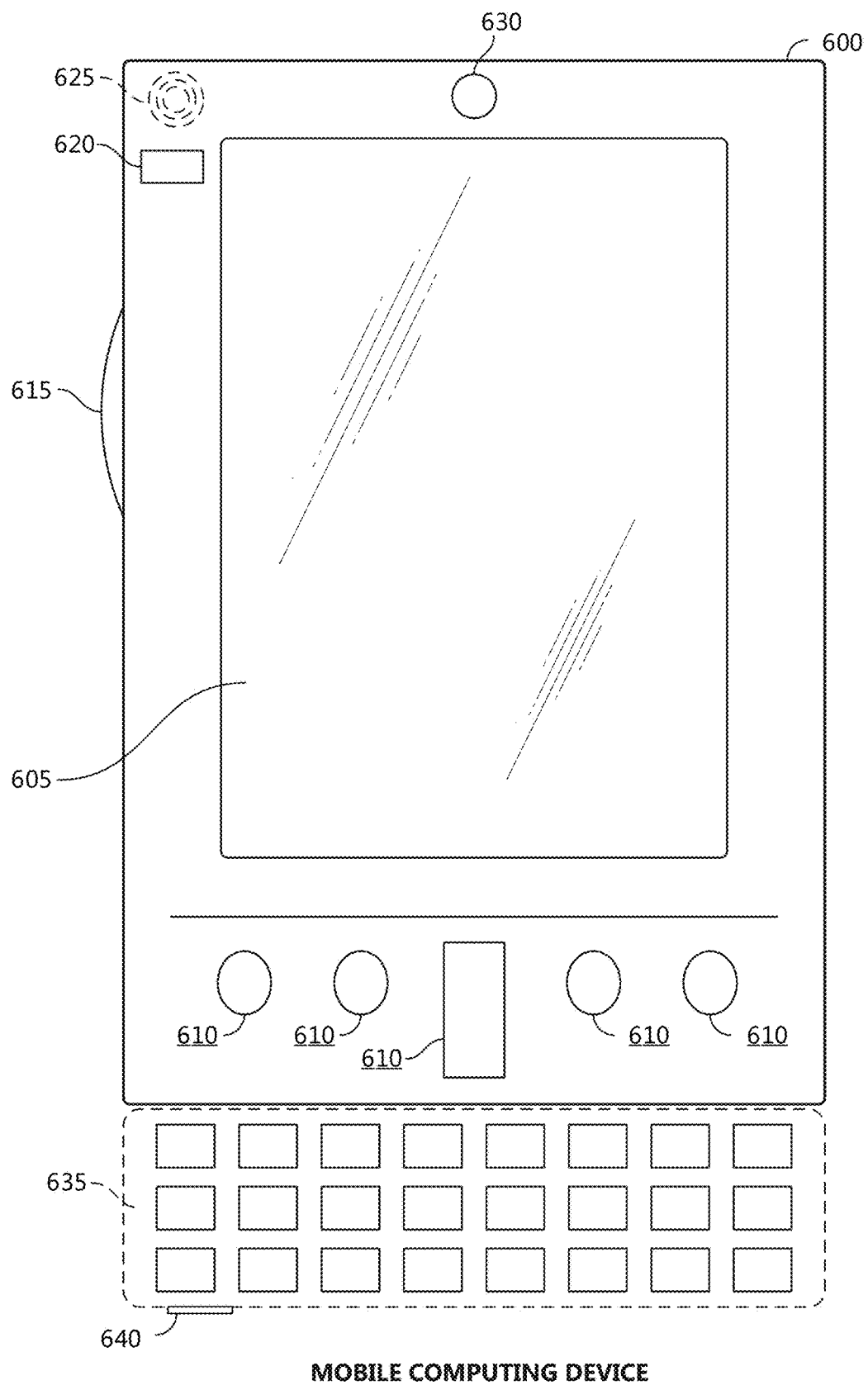
FIGS. 6A and 6B are block diagrams of a mobile computing device with which aspects may be practiced.
Figure 6B:
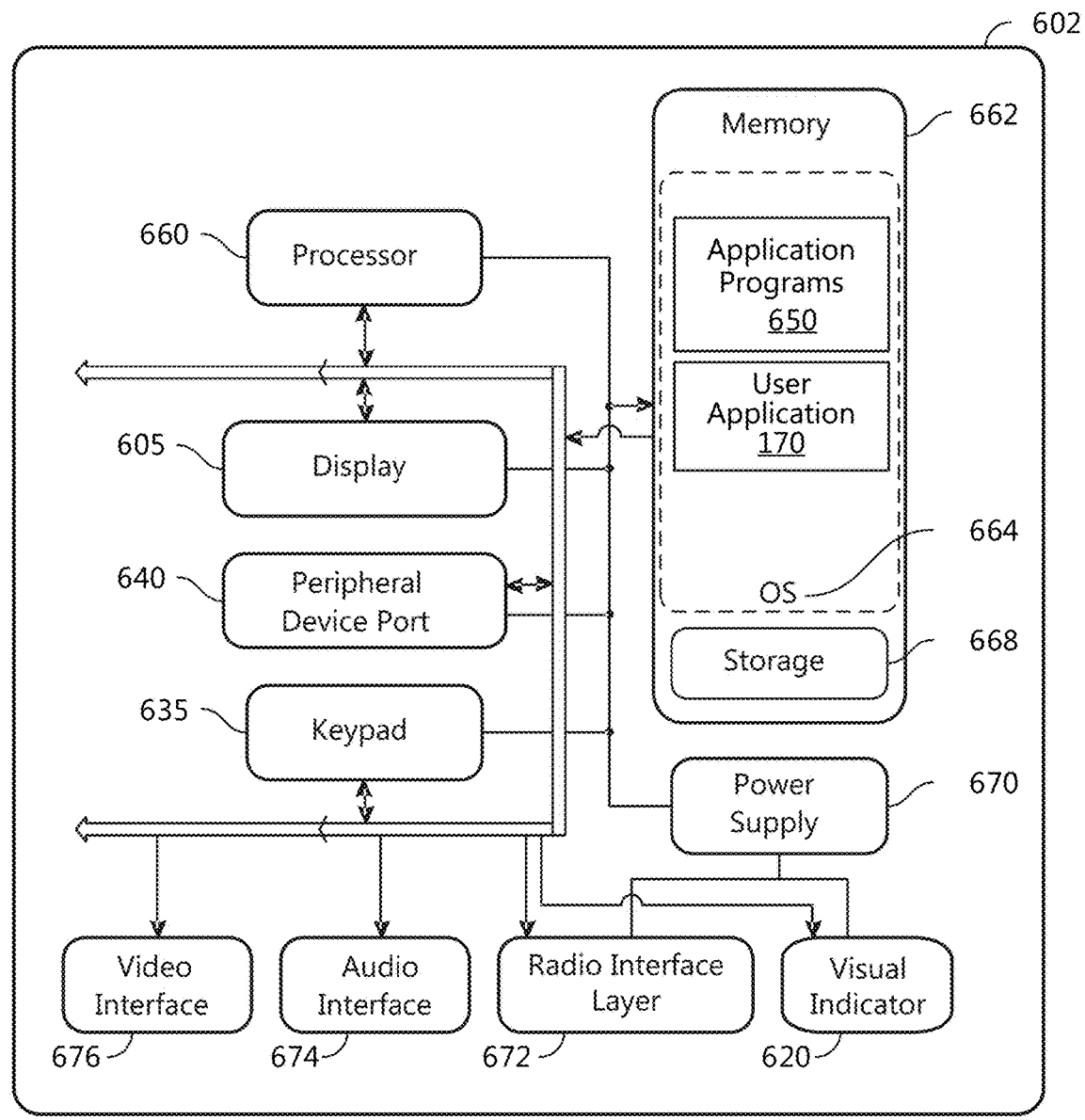
Figure 7:
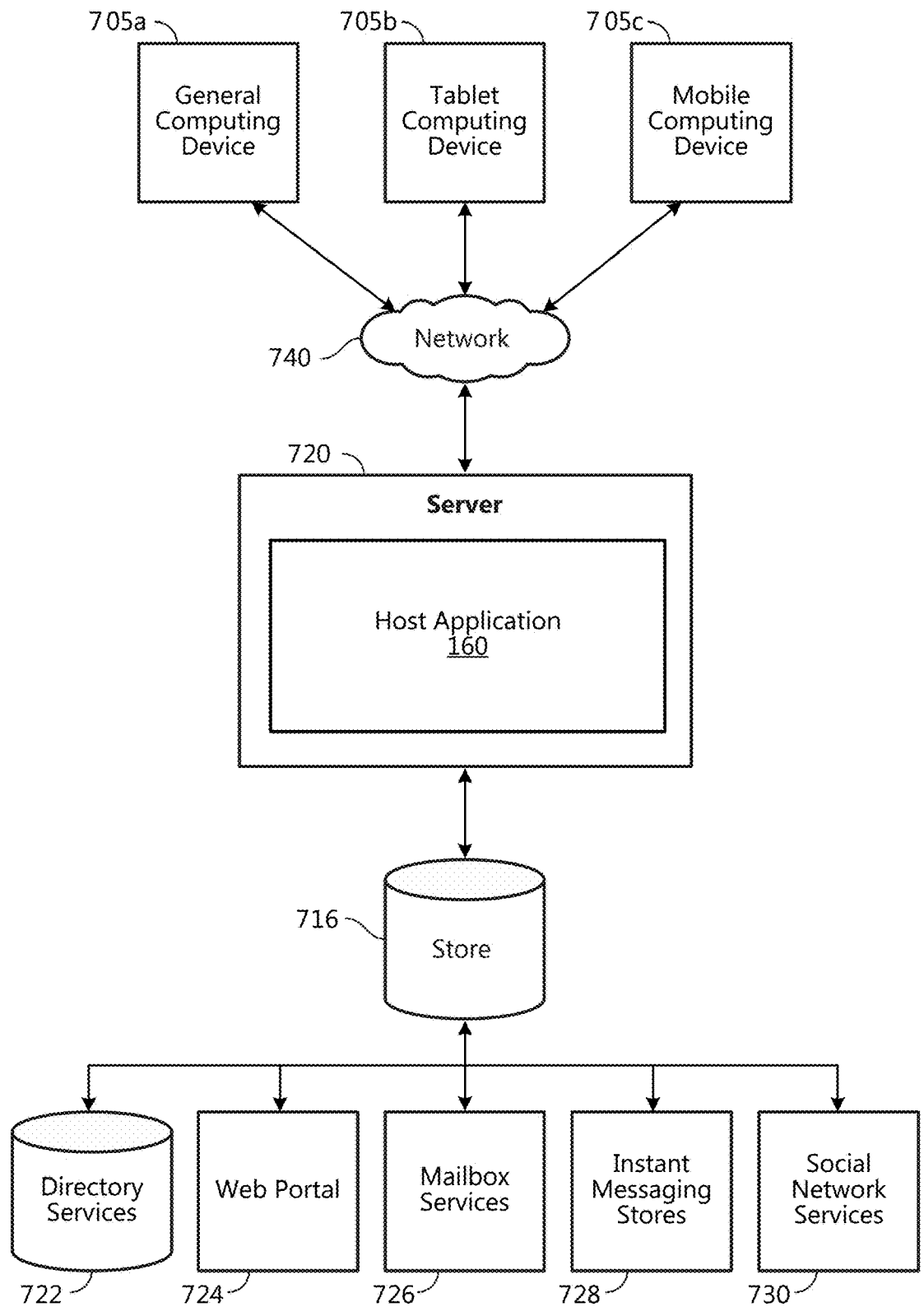
FIG. 7 is a block diagram of a distributed computing system in which aspects may be practiced.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the SDK and/or the user application 170 to enable a software application 550 to employ the teachings of the present disclosure via stored instructions. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., the SDK and/or the user application 170) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates a peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, an SDK and/or user application 170 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated, such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for automatic presentation of blocks of repeated content as described above. Content developed, interacted with, or edited in association with the host application 160 is enabled to be stored in different communication channels or other storage types. For example, various documents may be stored using a directory service 722, a web portal 724, a mailbox service 726, an instant messaging store 728, or a social networking site 730. The host application 160 is operative to use any of these types of systems or the like for distribution of selected content, as described herein. According to an aspect, a server 720 provides the host application 160 to clients 705a-c (generally clients 705), which may be run user machines 110. As one example, the server 720 is a web server providing the host application 160 over the web. The server 720 provides the host application 160 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for enabling freeform input in a user application that does not natively support freeform input, comprising:
   defining, by a computing device, application code for an embeddable collaborative workspace, embedded in a document object model (DOM) for a document that is associated with the user application, the embeddable collaborative workspace, accessed through the DOM, comprises:
   a control interface frame that specifies location or size properties for displaying the embeddable collaborative workspace in the document associated with the user application, and wherein the control interface frame is linked to an embedded frame document separate from the document;
   an embedded frame document that stores the freeform input;
   an application frame, embedded in the control interface frame, wherein the application frame references a host application that is separate from the user application, and wherein the application frame that natively supports freeform input through the host application in the document associated with and displayed by the user application, which does not support freeform input; and
   the host application that accepts the freeform input;
   receiving a submit command to submit a freeform input into the embeddable collaborative workspace in the document associated with the user application; and
   adding a reference to an embedded frame document in the control interface frame.

2. The method of claim 1, wherein the host application is run remotely from the document associated with the user application.

3. The method of claim 2, wherein the host application is provided by a cloud server as part of a Software-as-a-Service solution.

4. The method of claim 1, further comprising temporarily storing the freeform input in the embeddable collaborative workspace.

5. The method of claim 4, further comprising retrieving existing content stored in the embedded frame document and displaying the retrieved content in the embeddable collaborative workspace according to the control interface frame.

6. The method of claim 4, wherein the embeddable frame document is stored remotely from the document associated with the user application on a cloud server as part of a Software-as-a-Service solution.

7. The method of claim 4, further comprising granting access to provide input a to the embeddable collaborative workspace to a plurality of users.

8. The method of claim 7, further comprising associating an identifier in the embeddable collaborative workspace with each of the plurality of users.

9. A system for enabling freeform input in a user application that does not natively support freeform input, comprising:
   a processing unit; and
   a memory storing instructions, which when performed by the processing unit are operable to provide:
   a user application, providing a document defined by a Document Object Model (DOM), the DOM defining application code for an embeddable collaborative workspace in the DOM that is associated with the user application, wherein the embeddable collaborative workspace, accessed through the DOM, comprises:
   a control interface frame that specifies location or size properties for displaying the embeddable collaborative workspace in the document associated with the user application, and wherein the control interface frame is linked to an embedded frame document separate from the document;
   an embedded frame document that stores the freeform input;
   an application frame, embedded in the control interface frame, wherein the application frame references a host application that is separate from the user application, and wherein the application frame supports freeform input through the host application in the document associated with and displayed by the user application, which does not support freeform input; and
   the host application that accepts the freeform input.

10. The system of claim 9, wherein the embedded frame document is stored on a local device, wherein the embedded frame document temporarily stores the freeform input made in the embeddable collaborative workspace.

11. The system of claim 9, wherein the control interface creates the embedded frame document.

12. The system of claim 9, wherein the embeddable collaborative workspace is operable to receive structured input.

13. The system of claim 9, wherein the control interface links to an embedded frame document stored on a remote device, wherein the embedded frame document is accessible by multiple users.

14. The system of claim 13, wherein freeform input from each user of the multiple users is associated with a unique identifier.

15. The system of claim 9, wherein the embeddable collaborative workspace wherein the control interface links to an embedded frame document that is part of an email message, wherein the embedded frame document stores the freeform input made in the embeddable collaborative workspace and is transmitted with the email message to a recipient.

16. A computer readable storage device including instructions, which when executed by a processor are operable to provide a method for enabling freeform input in a document that does not natively support freeform input, comprising:
   defining, by a computing device, freeform input objects;
   referencing, by the computing device, a host application in a document object model (DOM) of the document;
   defining, by the computing device, application code for an embeddable collaborative workspace in the DOM for the document that is associated with a user application, wherein the embeddable collaborative workspace comprises:
   a control interface frame that specifies location or size properties for displaying the embeddable collaborative workspace in the document associated with the user application, and wherein the control interface frame is linked to an embedded frame document separate from the document;
   an embedded frame document that stores the freeform input;

an application frame, embedded in the control interface frame, wherein the application frame references a host application that is separate from the user application, and wherein the application frame supports freeform input through the host application in the document associated with and displayed by the user application, which does not support freeform input; and the host application that accepts the freeform input.

17. The computer readable storage device of claim 16, wherein the host application includes a software developer kit.

18. The computer readable storage device of claim 16, wherein the embeddable frame document stores the inputs to the embeddable collaborative workspace temporarily.

19. The computer readable storage device of claim 16, wherein a plurality of users are granted access to the embeddable collaborative workspace to provide the inputs.

* * * * *